(12) United States Patent
Gogic

(10) Patent No.: US 9,198,122 B2
(45) Date of Patent: Nov. 24, 2015

(54) METHOD AND SYSTEM FOR SERVICE REDIRECTION BACKGROUND

(75) Inventor: Aleksandar M. Gogic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1248 days.

(21) Appl. No.: 12/248,778

(22) Filed: Oct. 9, 2008

(65) Prior Publication Data

US 2009/0098871 A1    Apr. 16, 2009

Related U.S. Application Data

(60) Provisional application No. 60/979,802, filed on Oct. 12, 2007.

(51) Int. Cl.
| | |
|---|---|
| H04W 4/00 | (2009.01) |
| H04W 48/18 | (2009.01) |
| H04W 16/32 | (2009.01) |
| H04W 48/12 | (2009.01) |
| H04W 84/04 | (2009.01) |

(52) U.S. Cl.
CPC ............. *H04W 48/18* (2013.01); *H04W 16/32* (2013.01); *H04W 48/12* (2013.01); *H04W 84/045* (2013.01)

(58) Field of Classification Search
CPC ..... H04W 48/18; H04W 16/32; H04W 48/12; H04W 84/045
USPC ...................................... 455/435.1
See application file for complete search history.

(56) References Cited

U.S. PATENT DOCUMENTS

| | | |
|---|---|---|
| 6,529,491 B1 | 3/2003 | Chang et al. |
| 8,041,335 B2 | 10/2011 | Khetawat et al. |
| 8,379,512 B2 | 2/2013 | Gogic et al. |

(Continued)

FOREIGN PATENT DOCUMENTS

| | | |
|---|---|---|
| JP | 2005109570 | 4/2005 |
| WO | 2005109688 A1 | 11/2005 |

OTHER PUBLICATIONS

International Search Report & Written Opinion—PCT/US2009/079563, International Search Authority—European Patent Office—Feb. 23, 2009.

(Continued)

*Primary Examiner* — Mahendra Patel
*Assistant Examiner* — Natasha Cosme
(74) *Attorney, Agent, or Firm* — QUALCOMM Incorporated IP Department

(57) ABSTRACT

System and method are provided for redirecting a communication device between a macro network and a femtocell network using a service redirection message (SRDM). In an embodiment, the communication device registers with the network which then determines the subscription status of the communication device to a femtocell network. If the subscription is confirmed, using the SRDM the system redirects the communication device to a communication frequency used by the femtocell network. Upon receipt of the SRDM, the communication devices tunes to a communication frequency specified in the SRDM. The system may segregate the CDMA channels used by the macro network, one set containing channels exclusive to the macro network and the other containing channel or channels used by both the macro network and the femtocell network. In this way, the communication device is prevented from entering a frequency re-hashing loop.

55 Claims, 9 Drawing Sheets

(56) References Cited

U.S. PATENT DOCUMENTS

| | | |
|---|---|---|
| 2005/0070283 A1 | 3/2005 | Hashimoto et al. |
| 2007/0140185 A1 | 6/2007 | Garg et al. |
| 2008/0293419 A1* | 11/2008 | Somasundaram et al. .... 455/437 |
| 2009/0097451 A1 | 4/2009 | Gogic |
| 2009/0097452 A1 | 4/2009 | Gogic |
| 2009/0098873 A1 | 4/2009 | Gogic |
| 2010/0069072 A1 | 3/2010 | Gogic et al. |
| 2013/0148632 A1 | 6/2013 | Gogic et al. |
| 2013/0150046 A1 | 6/2013 | Gogic et al. |

OTHER PUBLICATIONS

TIA: "IS2000.5-C, Upper Layer (Layer 3) Signaling Standard for cdma2000 Spread Spectrum Systems, Release C,p. 3-177-3-190, 3-443-3-446" TIA/EIA/IS-2000.5-C, May 2002, XP002514146 paragraphs [3.7.2.3.2.16], [3.7.2.3.2.18], [3.7.3.3.2.23].

3GPP2 C.S0005-0 Version 3.0,"Upper Layer (Layer 3) Signaling Standard for cdma2000 Spread Spectrum Systems—Release 0" Jul. 2001.

Taiwan Search Report—TW097139256—TIPO—Apr. 17, 2012.

* cited by examiner

METHOD AND SYSTEM FOR SERVICE REDIRECTION BACKGROUND

CLAIM OF PRIORITY UNDER 35 U.S.C. §119

The present Application for Patent claims priority to Provisional Application No. 60/979,802 entitled "Service Redirection Approach to Femtocell Discovery" filed Oct. 12, 2007, and assigned to the assignee hereof and hereby expressly incorporated by reference herein.

BACKGROUND

1. Field

The present application relates generally to wireless communications, and more specifically to techniques for service redirection of a communication device.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In recent years, users have started to replace fixed line communications with mobile communications and have increasingly demanded great voice quality, reliable service, and low prices. In addition to mobile phone networks currently in place, a new class of small base stations has emerged, which may be installed in a user's home and provide indoor wireless coverage to mobile units using existing broadband Internet connections. Such personal miniature base stations are generally known as femtocell network base station, femto base station (fBS), an access point (AP) base station, Home Node B (HNB) unit, or base station transceiver system (BTS). Typically, femtocells are connected to the Internet and the mobile operator's network via a digital subscriber line (DSL) router or cable modem.

Femtocells allow for cellular access where macro cellular base station support is weak or unavailable (e.g., indoors, remote locations, and the like), but may be deployed anywhere, even if macro cellular coverage is adequate, e.g. due to more favorable accounting offered by the cellular service communication provider, when customers use femtocells, in comparison to using macro cellular network. Femtocells may be described as small base stations that connect to wireless service providers via a broadband backhaul link, such as digital subscriber line (DSL), cable internet access, T1/T3, etc., and offer typical base station functionality, such as base transceiver station (BTS) technology, radio network controller, and gateway support node services. This allows a user device or an access terminal, also referred to as a cellular/user device or handset, or user equipment, to connect to the femtocells and utilize the wireless communication service. It is noted that user devices can include, for example, cellular phones, smart phones, laptops, handheld communication devices, handheld computing devices, satellite radios, navigational devices, PDAs, and/or any other suitable device for communicating over a wireless communication system.

A known method for a user device to locate a femtocell network base station is to use a preferred roaming list (PRL). The PRL is stored in a user device. To find a femtocell network base station, the user device must search for a femtocell network base station identified in the PRL. This search is typically performed by the user device every 3 minutes. This method can consume a lot of power, thus reducing the battery time of the user device. Another method is to use pilot beacons, which must be transmitted on each and every frequency of the system other than the femtocell frequency. Pilot beacons have many problems, including creation of coverage holes for non-femtocell terminals, excess power usage, and added interference on the macro network. Thus, what is needed is a system and method for redirecting a user device to a macro or femtocell network without the disadvantages identified above.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, method and systems are described in connection to redirecting a communication device to another communication frequency. The method may involve: determining a communication device subscription status to a femtocell network; sending a service redirection message to the communication device to instruct the communication device to retune to a first communication frequency (F1) based on the subscription status of the communication device; having the communication device register on the first communication frequency the device is instructed to retune, which may be served ether by the macro cellular system or a femtocell, depending on the communication device location at time of redirection; if the aforementioned registration is the femtocell, instructing a femtocell network base station to send any subsequent paging messages to the communication device on the frequency F1 when the subscription status indicates authorized access to the femtocell network.

In one embodiment, the method may further include instructions for generating a first list of CDMA (code division multiple access) channels available to the communication device for accessing the macro network; and for generating a second list of CDMA channels available to the communication device for accessing the femtocell network, or that portion of the macro network serving the frequency F1. In this way, the communication device is prevented from entering a loop by hashing back to a communication frequency that is different from the frequency F1 and subsequently being redirected to the frequency F1.

The service redirection message may include: an information to indicate that the device it is being redirected to is a CDMA system; an information that specifies how many frequencies (channels) may be a potential target of redirection (NUM_CHANS field); and an information that specifies one or more CDMA channels for the communication device to attempt to retune, until a suitable channel is found, using one or more CDMA_CHAN fields, wherein the number of CDMA channels is specified in the NUM_CHANS field. The first communication frequency for retuning the communication device may be specified by the first of the CDMA_CHAN fields. Further, the service redirection message may include a RETURN_IF_FAIL field having a value of 1, which indicates that the device should tune back on the original frequency if unsuccessful in acquiring the frequency to which it was redirected. Further, the service redirection message may include a REDIRECT_TYPE field having a value of 0 indicating ordinary redirection type, and a BAND_CLASS field that specifies a CDMA band class.

In accordance with yet another embodiment of the invention, a system configured to redirect a communication device to another communication frequency is provided. The system comprises: means for determining a communication device subscription status to a femtocell network; means for sending a service redirection message to the communication device to instruct the communication device to retune to a first communication frequency (F1) based on the subscription status of the communication device; and means for instructing the network to send any subsequent paging messages to the communication device on the frequency F1.

In accordance with yet another embodiment of the invention, a computer program product comprising a computer useable medium having computer readable program code functions embedded in said medium for causing a computer to redirect communication comprising: a first computer readable program code that causes the computer to determine a communication device subscription status to a femtocell network; a second computer readable program code that causes the computer to send a service redirection message to the communication device to instruct the communication device to retune to a first communication frequency F1 based on the subscription status of the communication device; and a third computer readable program code that causes the computer to instruct the network to send any subsequent paging messages to the communication device on the frequency F1.

In accordance with yet another embodiment of the invention, a method is provided to redirect communication of a communication device to a different communication channel including the procedure of: registering a communication device with a macro network; receiving a service redirection message from the macro network; retuning to a first communication frequency (F1) based on an information in the service redirection message; and receiving any subsequent paging messages on the communication frequency F1.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Figure 1:
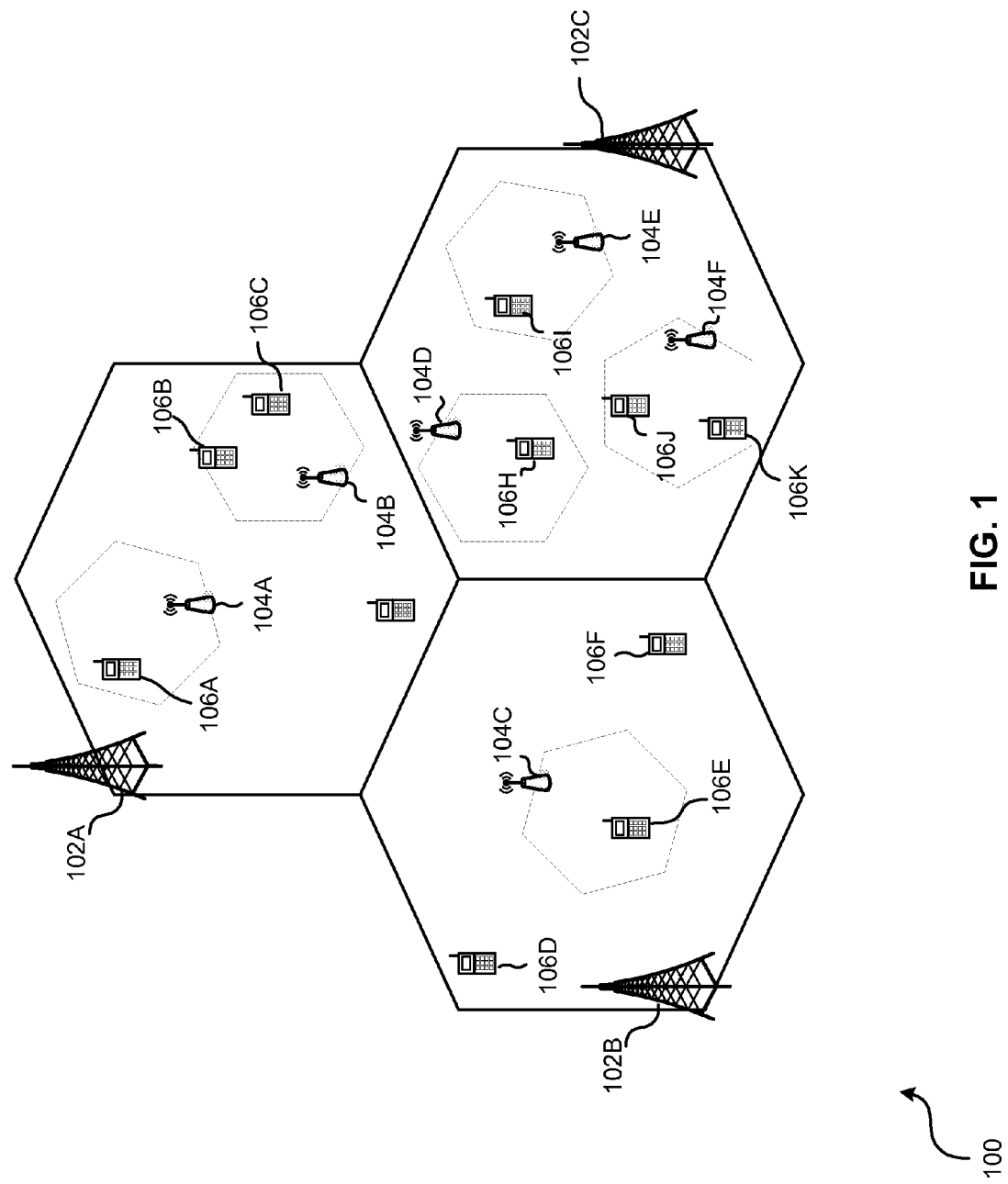
FIG. 1 illustrates an exemplary environment with which the present invention can be implemented.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments. Before describing the invention in detail, it is useful to describe an example environment with which the invention can be implemented. One such example environment is shown in FIG. 1.

FIG. 1 illustrates an exemplary wireless communication environment or system 100 adapted to support a number of users, in which various disclosed embodiments and aspects may be implemented. As shown in FIG. 1, by way of example, system 100 provides communication for multiple macro cells 102, such as, for example, macro cells 102A-102C. The system is further comprised of a multitude of femtocell network base stations 104 (such as femtocell network base stations 104A-104F). Various ATs 106, including ATs 106A-106K may be dispersed throughout the system 100. Each AT 106 may communicate with one or more femtocell network base stations 104 or with one or more macro base stations 102 on a forward link and/or a reverse link at a given moment, depending upon whether the AT is active and whether it is in soft handoff, for example. The wireless communication system 100 may provide service over a large geographic region, for example, macro cells 102A-102C may each cover a few blocks in a neighborhood or several square miles in a rural area.

Figure 2:
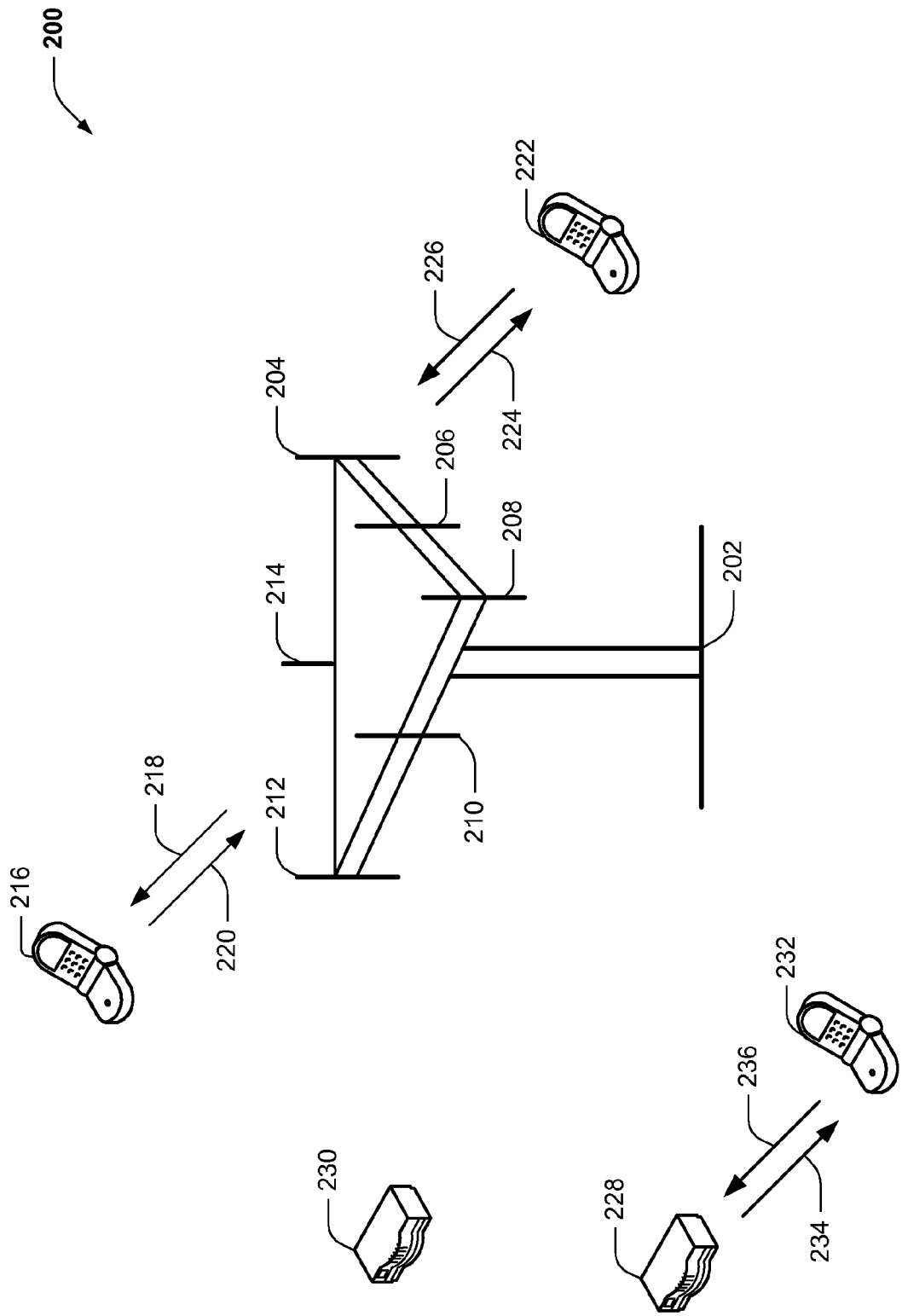
FIG. 2 illustrates an exemplary wireless communication system in accordance with various embodiments of the invention.

Referring now to FIG. 2, a wireless communication system 200 is illustrated in accordance with various embodiments presented herein. System 200 comprises a base station 202 that can include multiple antenna groups. For example, one antenna group can include antennas 204 and 206, another group can comprise antennas 208 and 210, and an additional group can include antennas 212 and 214. Two antennas are illustrated for each antenna group; however, more or fewer antennas can be utilized for each group. Base station 202 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Base station 202 can communicate with one or more ATs, such as, for example, AT 216 and AT 222.

As depicted in FIG. 2, AT 216 is in communication with antennas 212 and 214, where antennas 212 and 214 transmit information to AT 216 over a forward link 218 and receive information from AT 216 over a reverse link 220. Moreover, AT 222 is in communication with antennas 204 and 206, where antennas 204 and 206 transmit information to AT 222 over a forward link 224 and receive information from AT 222 over a reverse link 226. In a Frequency Division Duplex (FDD) system, forward link 218 can utilize a different frequency band than that used by reverse link 220, and forward link 224 can employ a different frequency band than that employed by reverse link 226, for example. Further, in a Time Division Duplex (TDD) system, forward link 218 and reverse link 220 can utilize a common frequency band and forward link 224 and reverse link 226 can utilize a common frequency band.

Each group of antennas and/or the area in which they are designated to communicate can be referred to as a sector of base station 202. For example, antenna groups can be designed to communicate to ATs in a sector of the areas covered by base station 202. In communication over forward links 218 and 224, the transmitting antennas of base station 202 can utilize beam forming to improve signal-to-noise ratio of forward links 218 and 224 for ATs 216 and 222. Also, while base station 202 utilizes beam forming to transmit to ATs 216 and 222 scattered randomly through an associated coverage, ATs in neighboring cells can be subject to less interference as compared to a base station transmitting through a single antenna to all its ATs. Moreover, ATs 216 and 222 can communicate directly with one another using a peer-to-peer or ad hoc technology in one example.

Similar functionality of base station 202 can be implemented in femtocell network base stations 228 and 230, which can be deployed in smaller scale locations, such as a residence or office building for example. As mentioned previously, femtocell network base stations are also referred to as femtocells or Home Node B (HNB) units, and can have a broadband backhaul link to a wireless service provider, such as over DSL, cable, T1/T3, etc., and can provide wireless communication service to one or more ATs. As shown, femtocell network base station 228 can communicate with one or more AT(s) 232 over a forward link 234 and receive communication from the AT(s) 232 over a reverse link 236 similarly to the base station 202.

According to an example, femtocell network base station 230 can be deployed to provide wireless service access. Femtocell network base station 230 can connect to a wireless service access provider via broadband backhaul link, one or more disparate femtocells or macro cells over-the-air, etc. Upon being deployed, femtocell network base station 230 can optionally self-configure, or be configured with the assistance of the macro-cellular system largely without manual/human intervention, to avoid interference with surrounding femtocells (e.g., femtocell network base station 228) and macro cells (e.g., base station 202 or a sector/cell thereof). In this regard, femtocell network base station 230 can receive signals from the base station 202 and disparate femtocell network base station 228 much like ATs 216, 222, and 232. The signals can be overhead system messages that can be utilized by the femtocell network base station 230 to determine configuration parameters utilized by the disparate femtocell network base station 228 and/or base station 202.

The configuration parameters can be determined by femtocell network base station 230 for similar environment configuration. In addition, the parameters can be determined and utilized to ensure femtocell network base station 230 selects different parameters to mitigate interference. These parameters can include, for example, a channel identifier (e.g., a Code Division Multiple Access (CDMA) channel ID), a Pilot pseudo-noise (PN) offset, and/or the like, for femtocell network base station 228, base station 202, and/or substantially any other surrounding transmitters. Femtocell network base station 230 can accordingly self-configure (or automatically configure with assistance of the cellular system as described above) its channel identifier, Pilot PN offset, etc., so as not to interfere with the surrounding femtocells and macro cells. Additionally, femtocell network base station 230 can utilize this information to build a neighbor list of surrounding femtocells and macro cells to facilitate hard and soft handoffs for devices communicating with femtocell network base station 230. It is noted that femtocell network base station 230 may be adapted to receive RF signals, for example, from femtocell network base station 228 and/or base station 202 to determine timing, location, and/or the like.

Figure 3:
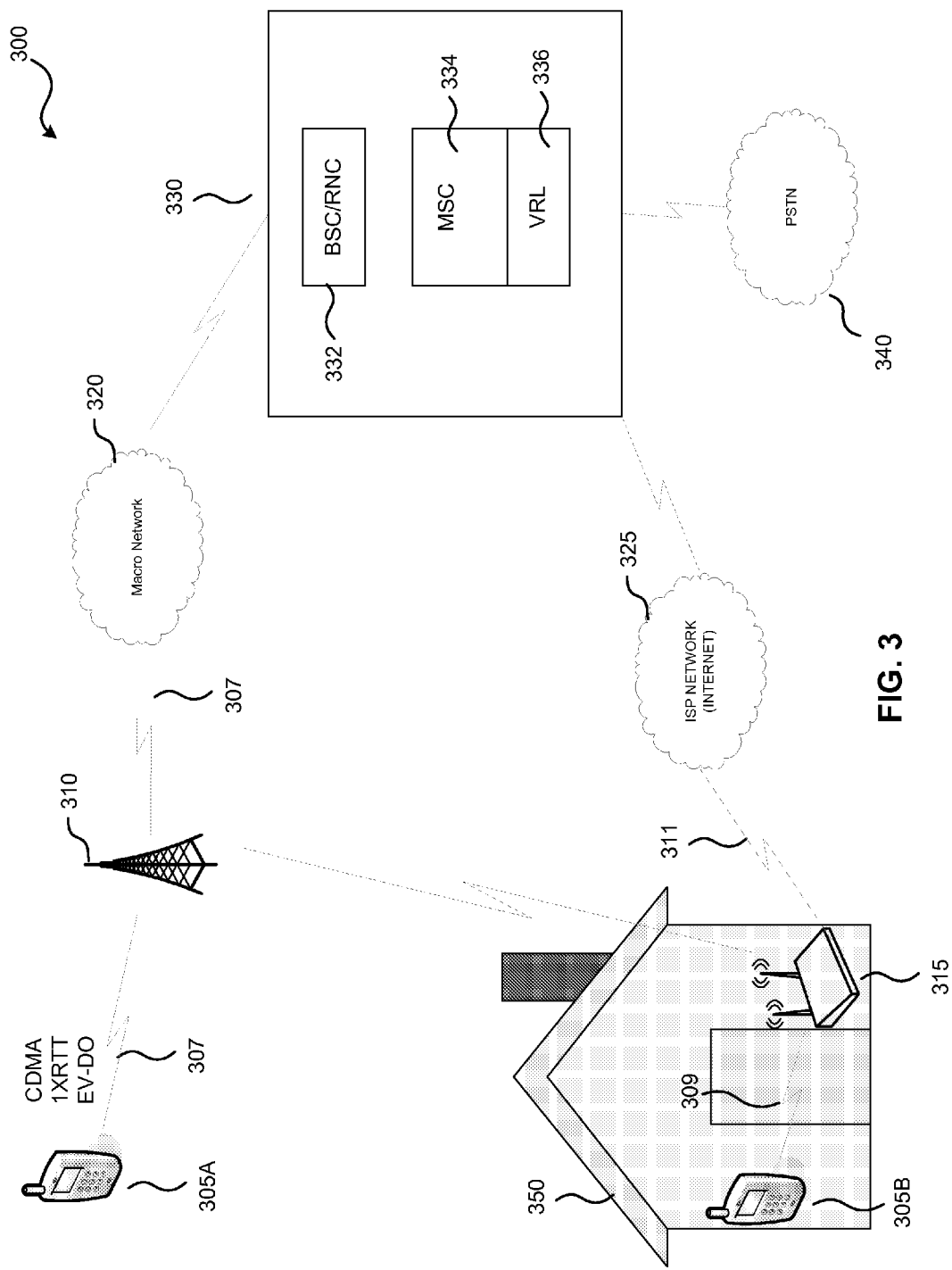
FIG. 3 illustrates an exemplary environment with which system and method for service redirection, according to embodiments of the present invention, can be implemented.

FIG. 3 illustrates another example environment 300 with which the systems and methods of the present invention can be implemented according to one or more embodiments of the present invention. Referring now to FIG. 3, environment 300 includes user device 305A-B, abase station 310, a femtocell network base station 315, a macro network 320, a broadband or ISP network 325, a network core 330, a base station controller (BSC) or radio network controller (RNC) 332, a mobile switching center (MSC) 334, and Public Switched Telecommunication Network (PSTN) 340. In operation, user device 305A sends and receives data to and from base station 310 via a communication interface 307, which may use various communication standards such as CDMAone, CDMA2000, W-CDMA (wideband CDMA, also known as Universal Mobile Telecommunications System (UMTS)), or other suitable radio communication interface. Base station 310 is also in communication with macro network 320 via communication interface 307. It is further noted that system 300 may be configured to operate on 3rd Generation Partnership Project (3GPP) (Rel99, Rel5, Rel6, Rel7, etc.) technology, as well as 3GPP2 (1xRTT, 1xEV-DO Rel0, RevA, RevB, etc.) technology, and other known and related technologies.

Signals from macro network 320 are received by a network controller at network core 330. Depending on the types of the communication network deployed, the network controller may be a RNC, a modified RNC, a UMA (Ultra Wideband Medium Access) network controller (UNA), or a session initiation protocol (SIP) gateway. In an example of existing infrastructures that are commonly deployed in the United States, base station 310 is in operative communication with RNC 332.

RNC 332 may be in operative communication with a mobile switching center (MSC) 334 or similar service delivery node responsible for handling voice calls, short message service (SMS), as well as other services (e.g., conference calls, FAX and circuit switched data). The MSC 334 may set up and release the end-to-end connections, handle mobility and hand-over requirements during the call, take care of charging and real time pre-paid account monitoring, etc.

The MSC 334 may include, or otherwise be in communication with, a visitor location register (VLR) 336 or similar temporary database of network subscribers who have entered or roamed into a particular area. The VLR 336 may be in operative communication with a registry (not shown), which may generally comprise a database that contains details of mobile phone subscribers authorized to use the operator's network. For example, the registry may comprise a Home Location Register (HLR) in the illustrative context of a Global System for Mobile Communications (GSM) core network.

MSC 334 may be in operative communication with a public switched telephone network (PSTN) 340, public land mobile network (PLMN), or other similar network. In this way, network core 330 can deliver voice and data services to end users that are connected to one of those networks. System 300 may be scaled to include additional MSCs and registries (not shown) in operative communication with MSC 334 to increase capacity.

As shown in FIG. 3, user device 305B communicates with network core 330 via femtocell network base station 315 that can be configured to use an internet backhaul service 325 to transfer voice and non-voice data therebetween. Broadband backhaul service can be the internet, a digital subscriber line (DSL) service, a cable internet service, a local area network (LAN), a wide area network (WAN), a plain old telephone system (POTS), or any other suitable broadband network. User device 305B communicates with base station 315 via communication link 309, which can be an RF communication interface similar to link 307, such as for example, CDMA2000, W-CDMA, WiMAX, or LTE. In one embodiment, communication links 307 and 309 of system 300 are the same (i.e., both are CDMA2000 RF interfaces). It is noted that the public network may comprise any communication network, wired or wireless, utilizing any known standards, such as, for example, a wide area network (WAN), a campus area networks (CAN), a metropolitan area networks (MAN), etc. It is further noted that the public network may include a wireless local area network (WLAN), such as, for example, 802.11a, 802.11b, 802.11g, 802.11n, etc. The WAN macro cell may be based on Ultra Mobile Broadband (UMB), Long Term Evolution (LTE), Worldwide Interoperability for Microwave Access (WiMAx), etc. System 300 may comprise WAN macro cells and femtocells deployed within the same general geographical area, where femtocells reuse the same carrier as the WAN system. The WAN system may use legacy technology, such as, for example, cdma2000, while the femto system may use the same technology or a new technology, such as, for example, an evolved version of cdma2000 that supports femtocell network base station operation more efficiently.

Femtocell network base station 315 can be configured to transfer data over network 325 using communication link 311. Depending on the type of system being deployed, communication link 311 may use VoIP (voice over IP), Iub over IP (Iub is a standard transport protocol designed to encapsulate voice and/or non-voice data and to signal as an internet protocol that is tunneled over network 325), UMA signaling, SIP signaling, or other suitable communication network protocol.

Similar to data received from macro network 320, network core 330 processes data received from network 325 with a suitable network controller. The type of network controller used by core network 330 depends upon the architecture of the femtocell transceiver located inside of femtocell network base station 315. For example, there are various femtocell architectures such as IP RAN (Radio Access Network) and SIP/IMS. Within the IP RAN architecture there are various femtocell solutions such as modified RNC, concentrator, and collapsed stacked (to name a few) that would require different hardware architecture either in the network core or in the femtocell network base station, or both of the network core and the femtocell network base station (i.e., base station 315).

Femtocell networks may be deployed in two scenarios. The first scenario is to use dedicated frequency or frequencies for the femtocell network. This means frequencies used by the femtocell network are exclusive to the femtocell network and are not used by the macro network. The second deployment scenario is the frequency reuse scenario where the same frequency is being used by both the femtocell and macro networks. In this deployment scenario, multiple base stations (e.g., femtocell network base stations and macro base station) can use the same frequency or frequencies. This allows the network operator to service more user devices without using additional frequency bandwidth. Since the macro network operates on licensed RF spectrums, which can be very expensive, the cost savings of frequency reuse can be tremendous.

In either deployment scenario, a user device may need to register with the macro network, the femtocell network or both, once it acquired the frequency of such networks. In one scenario, when a user device is first turned on, it may be defaulted to a frequency for a macro network. Generally, user device 305 will stay on the macro frequency unless it is directed to another frequency such as the frequency (or CDMA channel) used by the associated femtocell network. It should be noted that a macro network CDMA channel and a femtocell network CDMA channel can share the same frequency but they utilize communication channel separation scheme.

In another scenario, a user device may already be tuned to a femtocell frequency but does not have the authorization for using the femtocell network. In this case, user device 305 can be redirected to another frequency where non-femtocell systems are deployed (e.g., the macro network). Optionally, user device 305 can be allowed temporary access to the femtocell network in order to register with the femtocell network but is subsequently redirected to a non-femtocell frequency.

Figure 4:
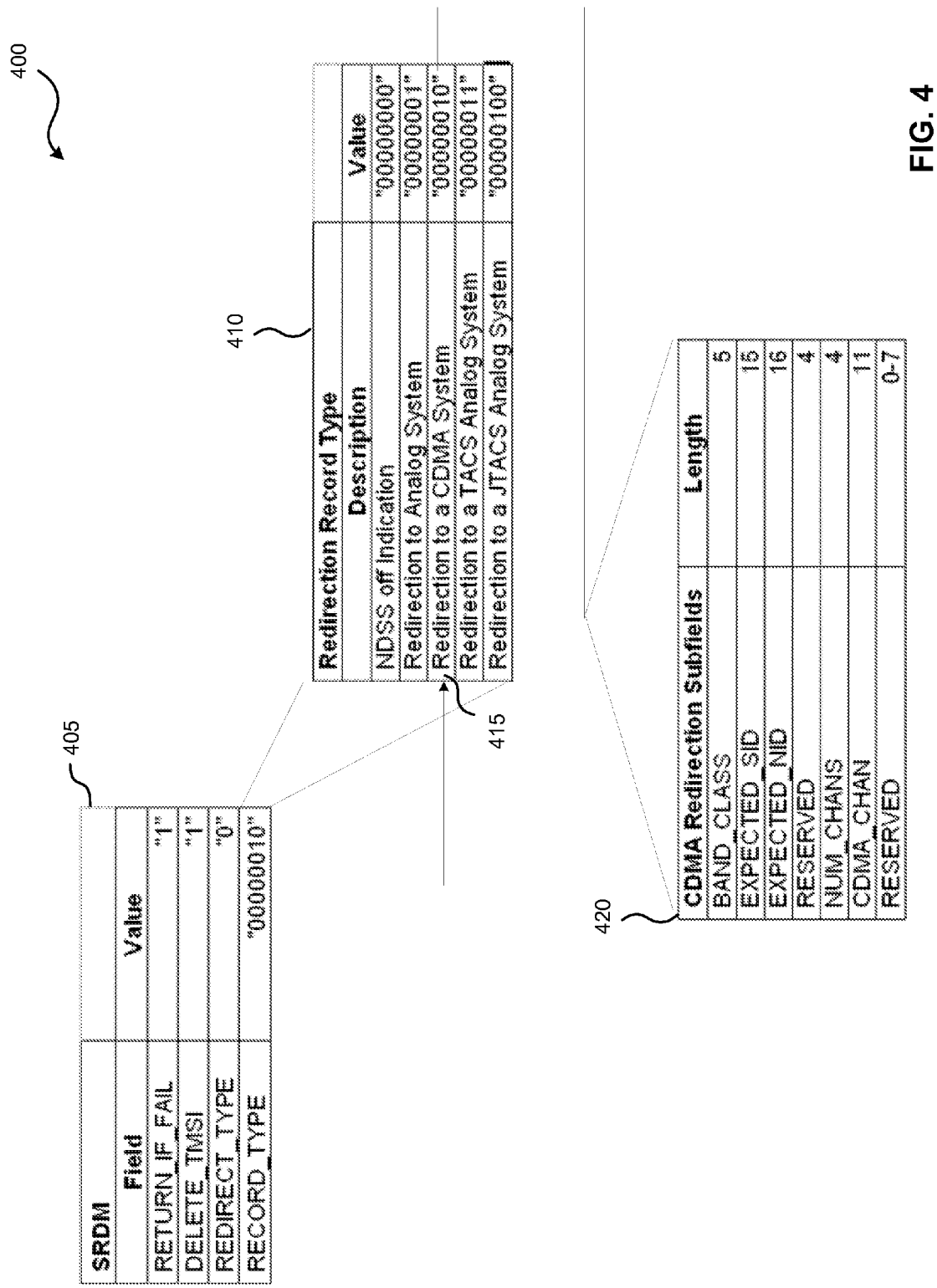
FIG. 4 illustrates a graphical representation of a SRDM message according to an embodiment of the present invention.

In system 300, user device 305 can be redirected from one frequency to another frequency (e.g., a frequency used only by the macro network to a frequency used by both the macro network and femtocell network) using a service redirection message (SRDM). The SRDM can be sent out to user device by the network core or by a base station such as a femtocell base station or a macro base station. FIG. 4 illustrates a graphical representation of SRDM tables 400 which illustrates the content of the SRDM that can be implemented by methods and systems of the present invention according to one or more embodiments of the present invention. Tables 400 include a main SRDM table 405, a redirection record type table 410, and a CDMA redirection subfields table 420. In one embodiment, system 300 is configured to implement SRDM 400.

SRDM tables 405, 410, and 420 contain fields embedded within the SRDM being sent to user device 305 by the network core. The information contained in the SRDM tables may be generated at the network core or at a base station (e.g., femtocell network base station or macro network base station) or at other suitable location in the system. In one embodiment, the SRDM is transmitted by the base station. As shown, SRDM table 405 includes the following fields: RETURN_IF_FAIL, DELETE_TMSI, REDIRECT_TYPE, AND RECORD_TYPE. Each of these fields is described in detail by the $3^{rd}$ Generation Partnership Project2 (3GPP2) document C.S0005-0, version 3.0, Jun. 15, 2000, which is herein incorporated by reference.

The RETURN_IF_FAIL field has a bit length of 1 and may have a value of '0' or '1'. If user device 305 is required to return to the system from which it is being directed upon failure to obtain service, this field is set to '1'. Otherwise, this field is set to '0'. In one embodiment, the RETURN_IF_FAIL field is set to '1'.

The DELETE_TMSI field also has a bit length of 1. This field is set to '1' if user device 305 is required to delete the TMSI (Temporary Mobile Station Identity) assigned to user device 305. Otherwise, this field is set to '0'. In one embodiment, the DELETE_TMSI field is set to '0'. Alternatively, this field could be set to '1'.

The REDIRECT_TYPE field is another indicator field having a bit length of 1. This field is set to '0' if the redirection type is normal. In one embodiment, the REDIRECT_TYPE field is set to '0'.

The RECORD_TYPE field has a bit length of 8 bits. The value of the field corresponds to one of the subfields of table 410. In one embodiment, this field has a value of '00000010'. This means user device 305 is being redirected to a CDMA system. As illustrated in table 410, user device 305 can also be redirected to an analog system, a TACS (total access communication system) analog system, or a JTACS (Japan TACS) analog system, or to another communication system.

When the RECORD_TYPE field has a value of '00000010', the SRDM is configured to include CDMA redirection subfields shown in SRDM table 420. As shown, table 420 includes the following subfields: BAND_CLASS, EXPECTED_SID, EXPECTED_NID, RESERVED, NUM_CHANS, CDMA_CHAN, and second RESERVED field. As previously mentioned, the information contained in the SRDM can be created at the network core or at the base station such as a femtocell network base station or a macro network base station.

The BAND_CLASS field is set to the CDMA band class in which the user device 305 is being redirected. The EXPECTED_SID field is the SID of the network to which the redirection is intended. If redirection is unconditional or SID of the target network is unknown, the network sets this field to '0'. Similarly, the EXPECTED_NID is used to condition the completion of redirection by a particular network identity of the target network. If redirection is unconditional as to the target network identity, then the field is set to '65535'. The RESERVE filed is typically set to '0000', but may have other value.

The NUM_CHANS field indicates the number of occurrences of the CDMA_CHAN field in the SRDM. For each CDMA channel on which a user device is to attempt to connect with, an associated and unique CDMA channel identifier is provided in the CDMA_CHAN field. For example, if there are four available CDMA channels for a user device to attempt to acquire connection, there will be four separate CDMA_CHAN fields, each having a unique channel identifier.

In one embodiment, when user device 305 receives the SRDM with the above parameters, it can retune to the new frequency indicated by the SRDM. Upon the successful execution of the SRDM, user device 305 can register itself on the new frequency and then listens for any paging messages on the frequency. After proper registration with the network, for example a femtocell network, the system will cause the femtocell network to send out paging messages to user device 305 on the new frequency.

As previously mentioned, in a frequency reuse femtocell deployment scenario a user device may be in idle state on the macro system. A user device which has femtocell subscription will have been tuned to a frequency that is also used by femtocells, having been re-directed by SRDM message, as described above. When user device 305 detects pilot signal strength from a femtocell that is stronger than the pilot of the currently serving macro cell, the user device may perform idle handoff, and start monitoring the femtocell. User device 305 receives system parameters message from the femtocell. User device 305 may compare the SID/NID value in the system parameters message with the SID/NID value of the macro network that it was monitoring prior to commencing idle handoff. If the two sets of values for SID/NID do not match, user device 305 may register with the femtocell network. In one embodiment, registration is required. The user device 305 performs idle handoff in a like fashion when moving from a femtocell coverage area to a macro cell coverage area. In a dedicated femtocell deployment scenario, the macro network can be configured to periodically perform a system redirection with the RETURN_IF_FAIL field set to '1' in one embodiment. In this way if the service redirection fails (e.g. user device 305 is located outside the coverage area of the femtocell), user device 305 will return to the macro-cellular system and its current frequency.

Figure 5:
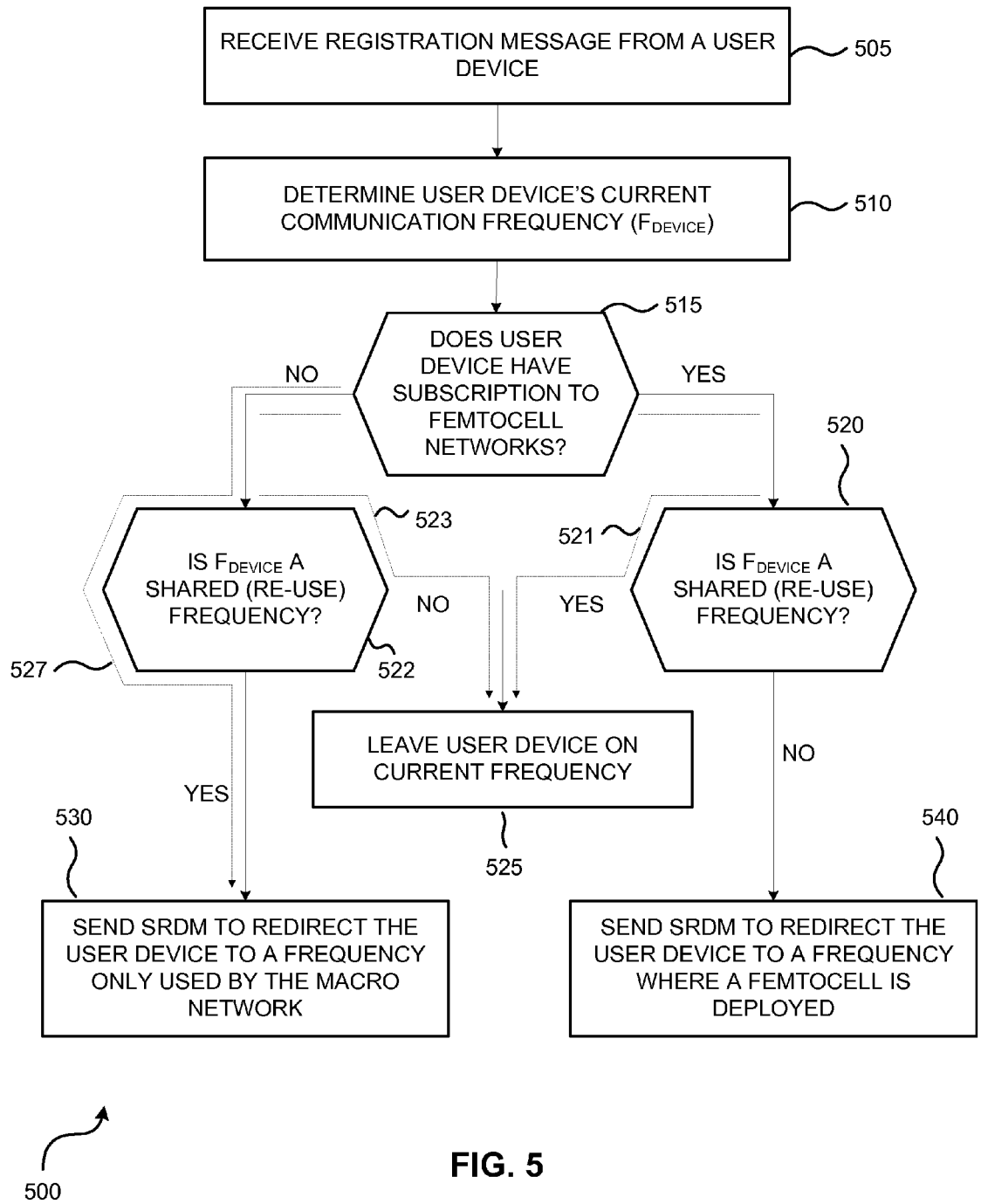
FIGS. 5-7 illustrate operational flow diagrams with which system and method of the present invention can be implemented.

FIG. 5 illustrates an operational flow diagram 500 according to one embodiment of the present invention. It should be noted that operational flow diagram 500 may be implemented at the network core or at a base station (e.g., macro base station or femtocell base station). Referring now to FIG. 5, operational flow diagram 500 begins at step 505 where the network receives a registration message from a user device such as user device 305. In step 510, the network determines the current communication ($F_{DEVICE}$) frequency being used by user device 305. Generally, user device 305 registers itself with the network using the $F_{DEVICE}$ frequency.

In step 515, the network checks the subscription of user device 305 to determine whether user device 305 has subscription to a femtocell network. This may be done using the user device's 305 identification number, for example. The network then determines in steps 520 and 522 whether the $F_{DEVICE}$ frequency is a re-use frequency where both macro-cell and femtocell are deployed. It should be noted that the system may have more than one re-use frequency.

Referring to path 521, if user device 305 has a femtocell subscription and the user device's 305 current communication ($F_{DEVICE}$) frequency is a frequency where the femtocell is deployed, then network will leave user device 305 on the current frequency and no service redirection message is sent. However, if in step 520 it is determined that the $F_{DEVICE}$ frequency is not a frequency where a femtocell is deployed, then the network sends a SRDM to the user device to redirect it a common frequency used by both the femtocell and macro networks (re-use frequency) in step 540. This enables user device 305 to communicate with the network core via the femtocell network base station instead of a macro network base station whenever it comes into the coverage area of the femtocell network. In this way, user device 305 may take advantage of any favorable accounting scheme for using the femtocell system, which simultaneously helps reduce air traffic on the macro network.

In the frequency reuse embodiment where user device 305 receives a system parameters message from a nearby femtocell network while it is in the process of executing a service redirection command from a macro network, or upon performing idle hand-in to the femtocell, user device 305 is configured to compare the SID/NID value of the femtocell network with the SID/NID value of the macro network. If the two values do not match, user device 305 must register with the femtocell network. When user device 305 is out of the femtocell network coverage area, user device 305 may stay on the macro network on the frequency also used by the femtocells.

In step 540 the network may also redirect user device 305 to a frequency that is only used by the femtocell network. This is referred to as a dedicated femtocell deployment scenario. In this scenario, the macro network can be configured to periodically perform a system redirection with the RETURN_IF_FAIL field set to '1'. In this way if the service redirection fails when user device 305 is outside femtocell coverage area, user device 305 will return to its current or default frequency. Once the user device 305 is within the coverage area of the femtocell, it will acquire it by completing SRDM successfully.

Referring now to path 523, if user device 305 does not have a femtocell subscription and the $F_{DEVICE}$ frequency is not a frequency where a femtocell is deployed then network will leave user device 305 on the current frequency and no service redirection message is sent. However, if in step 522 it is determined that the $F_{DEVICE}$ frequency is the same frequency where the femtocell is deployed, then the network sends a SRDM to user device 305 to redirect it to a frequency where only a macrocell is deployed in step 530.

Path 527 depicts exemplary scenarios where user device 305 is operating on a femtocell frequency but is not subscribed to femtocell or where it does not have proper authorization for accessing a particular femtocell. When this occurs, user device 305 is redirected to another non-femtocell frequency. In the case where user device 305 has a femtocell subscription generally but does not have access to a particular femtocell (e.g. femtocell is restricted to members of a particular household and those devices specifically authorized), the network may allow user device to register on the femtocell (so that it can be paged in case of an incoming call), but when a call is made (incoming or originated by user device 305), the channel resources from another frequency that is only deployed by the macro network are assigned by the system. In this way, user device 305 is prevented from entering a loop where it is being continuously redirected between the macro and femtocell networks.

In the case where user device 305 does not have general femtocell access and is using a frequency shared by the macro and femtocell networks, the network may redirect user device 305 to another frequency where only macro cells operate.

Figure 6:
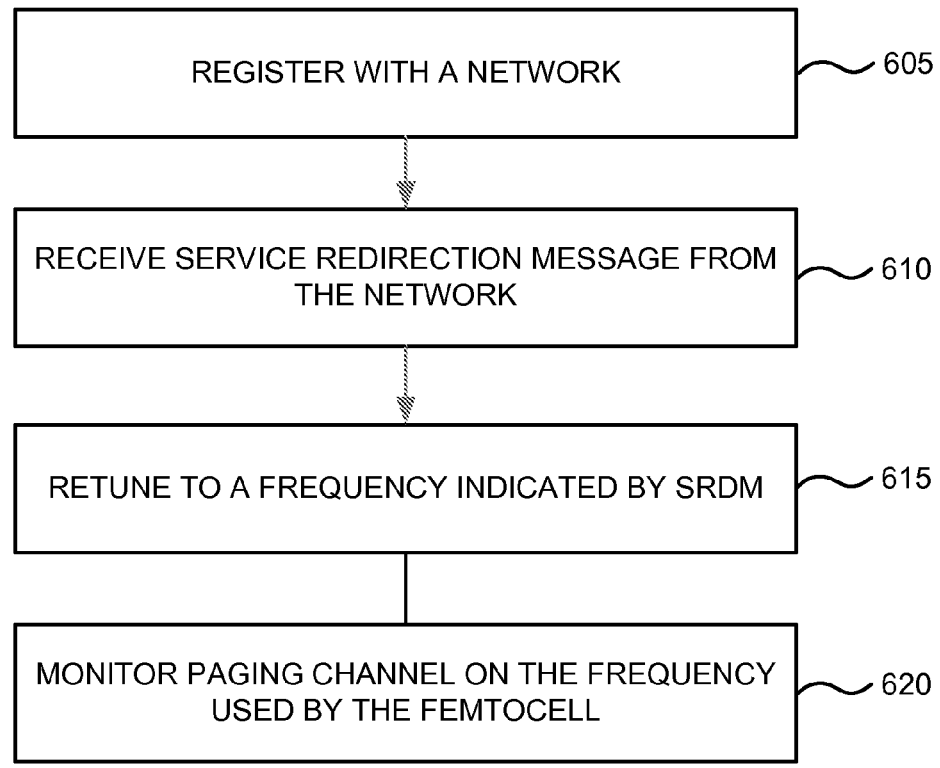

FIG. 6 illustrates an operational flow diagram 600 of a user device subscribed to femtocells while performing a service redirection routine (e.g., mobile phones, and PDAs) according to one embodiment of the present invention. It should be noted that operational flow diagram 600 may be implemented at the user device (e.g., user device 305) side of the system. Referring now to FIG. 6, operational flow diagram 600 begins at step 605 where a user device, such as user device 305, registers with a network core. Registration allows the network to determines, among other things, the frequency which user device 305 is currently using for communication.

Once user device 305 is registered with the network, user device 305 will receive a service redirection message if it needs to be redirected to another frequency at step 610.

In step 615, once the service redirection message is received by user device 305, it retunes to the frequency indicated by service redirection message. For example, a communication device subscribed to femtocells will be redirected and will retune to a frequency shared by the femtocells and macro cells. In step 620, user device 305 passively monitors the paging channel on the new frequency for a paging message on the frequency used by femtocells.

Figure 7:
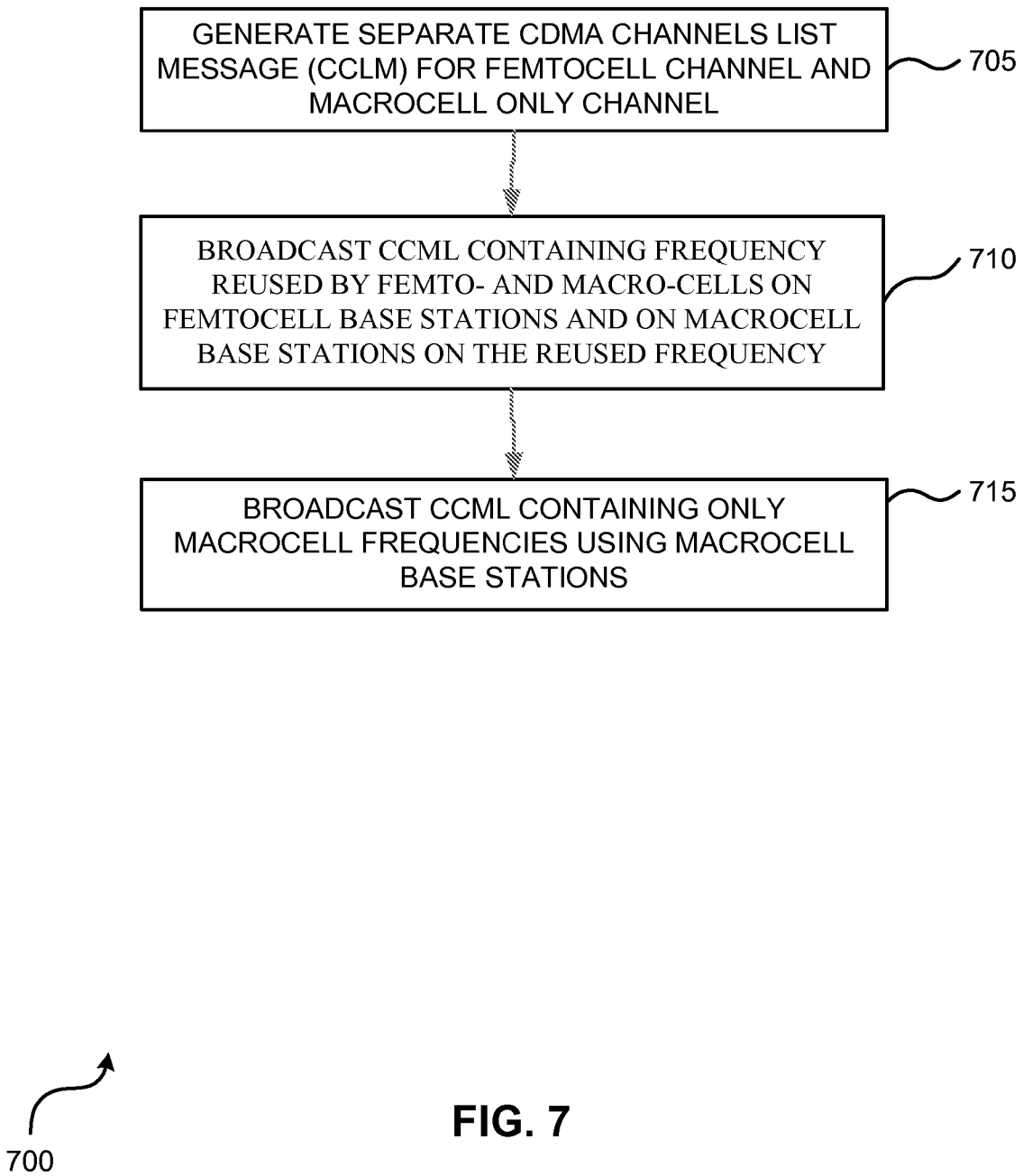

FIG. 7 illustrates an operational flow diagram 700 that can be implemented at a network core or a base station according to one embodiment of the present invention. Operational flow diagram 700 starts at step 705 where a CDMA channel list is generated for each channel or frequency supported by the base station. In one embodiment, the network may maintain two separate CDMA channel lists. One channel list contains frequencies only used by the macrocell network and the other channel list contains one frequency that is shared by the femtocell network and the macro network. It should be noted that the network may dedicated two or more frequencies as shared frequencies (or re-use frequencies) for use by both the femtocell and macro networks, but in the remaining text we use a single shared frequency as an example.

Generally, in a legacy base station, a common CDMA channel list is broadcasted on each channel frequency the base station supports. This means the same CDMA channel list is broadcasted on every channel frequency regardless of whether the channel frequency is a re-use frequency, a dedicated femtocell frequency, or a dedicated macrocell frequency. In one embodiment, base station 310 or 315 is configured to broadcast separate CDMA channel lists in various base stations and frequencies of operation, e.g.: (1) A first CDMA Channel List Message broadcast on each femtocell, containing the frequency of operation of that femtocell; (2) A second CDMA Channel List Message broadcast on all macro cells on the frequency or frequencies being reused by femtocells, and containing the frequency or frequencies being reused by both the femtocells and macro cells; and (3) A third CDMA Channel List Message broadcast by macro cells on each of the remaining macro cell frequencies, containing the frequencies that are in sole use by macro cells. For example, Consider the arrangement in which a channel frequency F1 is the re-use frequency where both femtocell and macrocell networks are deployed, and frequencies F2~F10 are in sole use by macro cells. Then femtocell base station 315 is configured to broadcast on the frequency F1 a CDMA Channel List Message containing only 'F1', see step 710. Continuing with our example, the macro base station 310 is configured to broadcast on the frequency F1 the CCLM also containing only 'F1', while the remaining frequencies of the macro base station 310 are all configured to broadcast CDMA channel frequencies 'F2, F3, . . . F10'. With this approach, when a user device in idle mode, when redirected to the frequency F1, will stay there (will not re-hash to one of the frequencies F2~F10), and likewise, a user device on any of the frequencies F2~F10 will tone to one among those 9 frequencies, without hashing to F1.

In the manner of CCLM configuration described, user device 305 is prevented from entering a loop upon being sent to a different frequency by means of SRDM message. For example, if a user device 305 that is subscribed to femtos is redirected to frequency F1, the user device will stay on that frequency since the CCLM on that frequency lists only F1, and not F2~F10.

Figure 8:
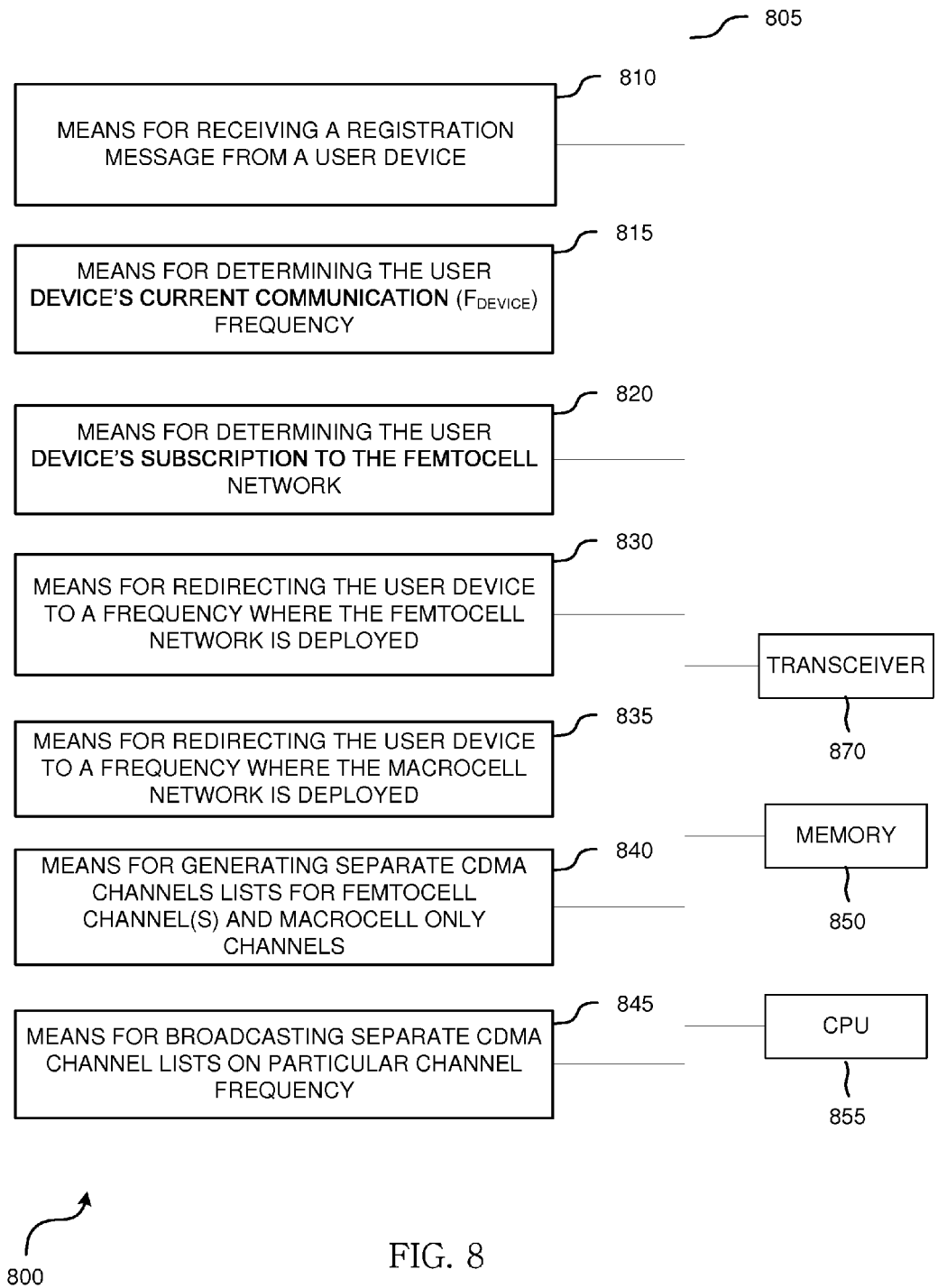
FIGS. 8-9 illustrate exemplary apparatuses for service redirection of a communication device, according to embodiments of the present invention.

With reference to FIG. 8, there is provided an exemplary apparatus 800 for redirecting communication service of a user device from one communication network to another communication network according to one embodiment of the present invention. As illustrated, apparatus 800 includes: a means 810 for receiving a registration message from a user device such as user device 305; a means 815 for determining user device's 305 current communication ($F_{DEVICE}$) frequency; a means 820 for determining user device's 305 subscription to the femtocell network; a means 830 for redirecting user device 305 to a frequency where the femtocell network is deployed; and a means 835 for redirecting user device 305 to a frequency where the macrocell network is deployed.

Apparatus 800 further includes: a means 840 for generating separate CDMA channel lists; and a means 845 to broadcast a distinct CDMA channel list on each of the particular channel frequencies of the macro system base station 310, and a distinct CDMA channel list of the femtocell system base station 315. In means 840, a first list contains CDMA channels that are only used by the macro network; a second list contains CDMA channels used by both the macro and the femtocell networks; and a third list contains CDMA channel used by the femtocell. In one embodiment, the second list contains only a sole frequency in which both femtocell and macrocell networks are deployed, and the third list is the same as the second list. In means 840, the first list will cause user device 305 to hash only to a frequency that is listed in the macro network list if it initially acquires the system using any of the frequencies in that CDMA channel lists. Likewise, in means 840, when applied to the second list with the sole member in the list in one embodiment, will cause the user device to stay on the frequency listed in the second list, namely on the frequency used by the femto network.

Apparatus 800 may include a processor 855 that may be in operative communication with the means 810-845 via a bus 805 or other similar communication coupling. Also, apparatus 800 may include an optional computer readable medium or memory device 850 that may be operatively coupled to the other components of the apparatus 800 via bus 805 or the like. The computer readable medium or memory device 850 may be adapted to store computer readable instructions and data for effecting the processes and behavior of either the means 810-845 or the methods disclosed herein. Apparatus 800 may also include a transceiver 870 operatively coupled to the other components of apparatus 800. A stand alone receiver and/or stand alone transmitter may be used in lieu of or in conjunction with transceiver 870.

Figure 9:
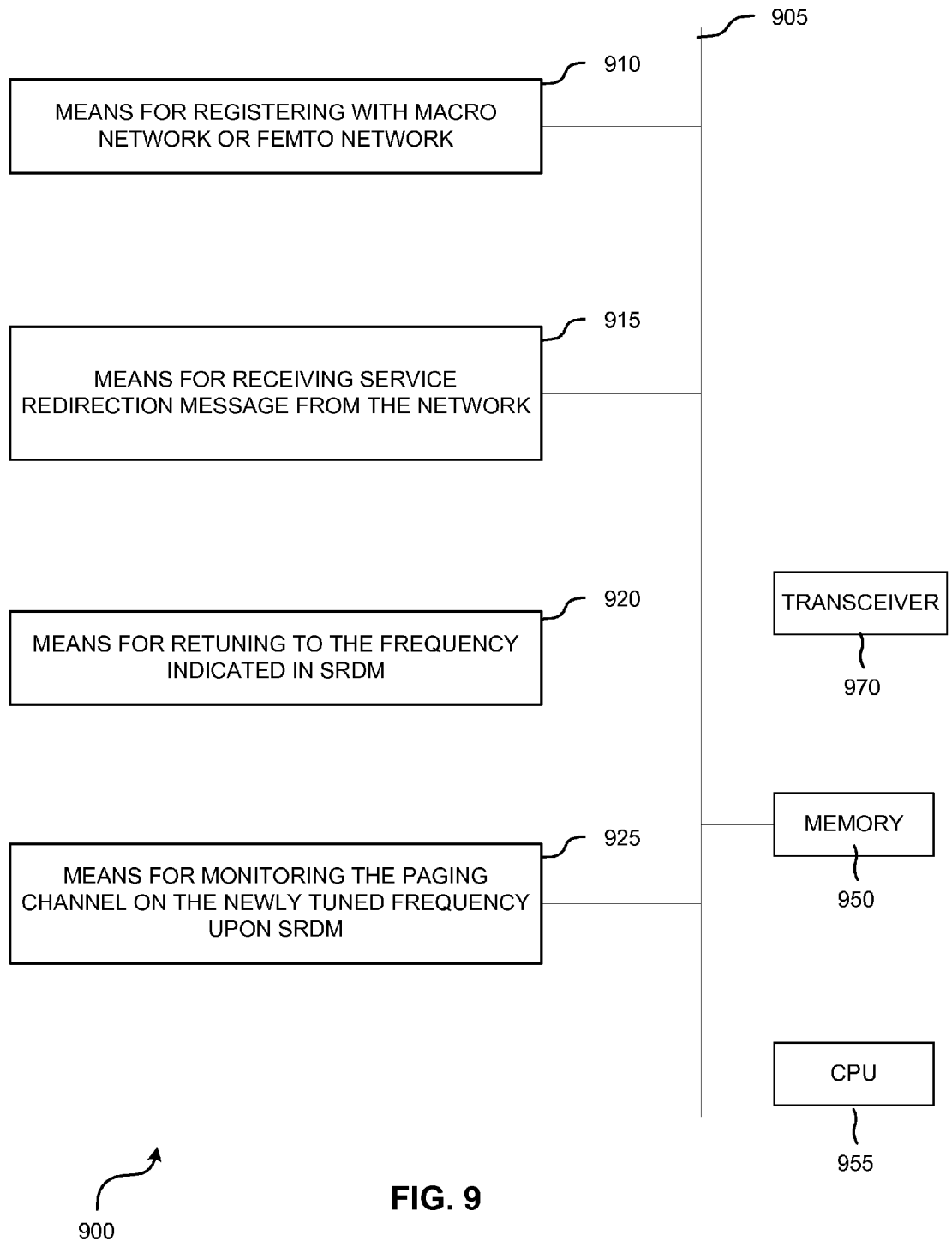

With reference to FIG. 9 there is provided an exemplary apparatus 900 for service redirection of a user device according to one embodiment of the present invention. Apparatus 900 includes: a means 910 for registering the user device with the macro network, the network core, or the femtocell network; a means 915 for receiving a service redirection message from one of the networks; a means 920 for re-tuning user device 305 to the frequency specified in means 915 (e.g. frequency in which femtocells are deployed); and a means 925 for monitoring the paging channel on the new frequency (e.g. monitoring for paging messages from the femtocell network).

Apparatus 900 may include a processor 955 that may be in operative communication with the means 910, 915, 920, and 925 via a bus 905 or other similar communication coupling. Also, apparatus 900 may include an optional computer readable medium or memory device 950 that may be operatively coupled to the other components of the apparatus 900 via bus 905 or the like. The computer readable medium or memory device 950 may be adapted to store computer readable instructions and data for effecting the processes and behavior of either the means 910, 915, 920, and 925, or the methods disclosed herein. Apparatus 900 may also include a transceiver 970 operatively coupled to the other components of apparatus 900. A stand alone receiver and/or stand alone transmitter may be used in lieu of or in conjunction with transceiver 970.

While this application describes particular examples of the present invention, those of ordinary skill can devise variations of the present invention without departing from the inventive concept. For example, the teachings herein refer to circuit-switched network elements but are equally applicable to packet-switched domain network elements. It is noted that the word "exemplary" is used herein to mean "serving as an example, instance, or illustration." Any embodiment described herein as "exemplary" is not necessarily to be construed as preferred or advantageous over other embodiments.

It will be appreciated that, in accordance with one or more aspects described herein, inferences can be made regarding determining communication parameters for a plurality of surrounding femtocells and/or macro cells as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Furthermore, various embodiments are described herein in connection with a user device. A user device can also be called a system, subscriber unit, subscriber station, mobile station, mobile, remote station, remote terminal, Access Terminal (AT), user terminal, terminal, wireless communication device, user agent, user device, or User Equipment. A user device can be a cellular telephone, a cordless telephone, a Session Initiation Protocol (SIP) phone, a Wireless Local Loop (WLL) station, a Personal Digital Assistant (PDA), a handheld device having wireless connection capability, computing device, or other processing device connected to a wireless modem. Moreover, various embodiments are described herein in connection with a base station. A base station can be utilized for communicating with user device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as Code Division Multiple Access (CDMA), Multiple-Carrier CDMA (MC-CDMA), Wideband CDMA (W-CDMA), High-Speed Packet Access (HSPA, HSPA+), Time Division Multiple Access (TDMA), Frequency Division Multiple Access (FDMA), Orthogonal Frequency Division Multiple Access (OFDMA), Single Carrier Frequency Domain Multiplexing (SC-FDMA) and other multiple access systems/techniques. The terms "system" and "network" may be used interchangeably. A CDMA system may implement a radio technology such as Universal Terrestrial Radio Access (UTRA), CDMA2000, etc. UTRA may includes W-CDMA and/or other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). It is further noted that the wireless communication system described herein may implement one or more standards, such as, for example, IS-95, cdma2000, IS-856, W-CDMA, TD-SCDMA, etc.

The various illustrative logical blocks, modules, and circuits described in connection with the examples disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in Random Access Memory (RAM), flash memory, Read-Only Memory (ROM), EPROM, Electrically Erasable Programmable Read-Only Memory (EEPROM), registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another, A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method for communication, comprising: receiving a registration message from a communication device; determining a current communication frequency of the communication device; determining whether the communication device has a subscription to a femtocell network; determining whether the current communication frequency is a shared frequency for macrocells and femtocells; and sending a service redirection message to the communication device to instruct the communication device to retune to a first communication frequency based on whether the communication device has a subscription to the femtocell network and whether the current communication frequency is a shared frequency, wherein the service redirection message specifies channels used by the femtocell network when the communication device has a subscription to the femtocell network.

2. The method of claim 1, wherein retuning to the first communication frequency comprises enabling the communication device to acquire a femtocell deployed in the first frequency upon the communication device entering a coverage area of the femtocell.

3. The method of claim 1, further comprising:
generating a first set of CDMA channels available to the communication device for accessing a macro network;
generating a second set of CDMA channels available to the communication device for accessing the macro network or the femtocell network; and
generating a third set of CDMA channels available to the communication device for accessing the femtocell network.

4. The method of claim 3, wherein the first communication frequency is from the first or the second set of CDMA channels.

5. The method of claim 3, wherein the macro network is a CDMA based network.

6. The method of claim 1, wherein the service redirection message comprises:
an information to redirect the communication device to a CDMA system;
an information that specifies a NUM_CHANS field; and
an information that specifies one or more CDMA channels for the communication device to retune using one or more CDMA_CHAN fields, wherein a number of CDMA channels is based on the NUM_CHANS field.

7. The method of claim 6, wherein the first communication frequency is specified by one of the CDMA_CHAN fields.

8. The method of claim 6, the service redirection message further comprising:
a RETURN_IF_FAIL field having a value of 1;
a REDIRECT_TYPE field having a value of 0; and
a BAND_CLASS field that specifies a CDMA band class.

9. The method of claim 1, wherein the service redirection message specifies CDMA channels only used by a macro network when the communication device does not have a subscription to the femtocell network.

10. The method of claim 1, further comprising:
allowing the communication device to register with the femtocell network regardless of whether the communication device has a subscription to the femtocell network.

11. The method of claim 1, further comprising determining whether the current communication frequency is a femtocell frequency.

12. The method of claim 11, wherein sending the service redirection message to the communication device is further based on whether the current communication frequency is a femtocell frequency.

13. A non-transitory computer-readable medium having computer-readable program code functions embedded in said medium for causing a computer to redirect communication comprising:
a first computer-readable program code that causes the computer to receive a registration message from a communication device;
a second computer-readable program code that causes the computer to determine a current communication frequency of the communication device;
a third computer-readable program code that causes the computer to determine whether the communication device has a subscription to a femtocell network;
a fourth computer-readable program code that causes the computer to determine whether the current communication frequency is a shared frequency for macrocells and femtocells; and a fifth computer-readable program code that causes the computer to send a service redirection message to the communication device to instruct the communication device to retune to a first communication frequency based on whether the communication device has a subscription to the femtocell network and whether the current communication frequency is a shared frequency, wherein the service redirection message specifies channels used by the femtocell network when the communication device has a subscription to the femtocell network.

14. The non-transitory computer-readable medium of claim 13, further comprising a sixth computer-readable program code that causes the computer to enable the communication device on the first frequency to acquire a femtocell deployed in the first frequency upon the communication device entering a coverage area of the femtocell.

15. The non-transitory computer-readable medium of claim 13, further comprising:
a sixth computer-readable program code that causes the computer to generate a first set of CDMA channels available to the communication device for accessing a macro network;
a seventh computer-readable program code that causes the computer to generate a second set of CDMA channels available to the communication device for accessing the macro network or the femtocell network; and
wherein the first communication frequency is from the first or the second set.

16. The non-transitory computer-readable medium of claim 15, wherein the service redirection message specifies CDMA channels used only by the macro network when the communication device does not have a subscription to the femtocell network.

17. The non-transitory computer-readable medium of claim 15, wherein the macro network is a CDMA based network.

18. The non-transitory computer-readable medium of claim 13, wherein the service redirection message comprises:
an information to redirect the communication device to a CDMA system;
an information that specifies a NUM_CHANS field; and
an information that specifies one or more CDMA channels for the communication device to retune and attempt to acquire using one or more CDMA_CHAN fields, wherein the number of CDMA channels is based on the NUM_CHANS field.

19. The non-transitory computer-readable medium of claim 18, wherein the first communication frequency is specified by one of the CDMA_CHAN fields.

20. The non-transitory computer-readable medium of claim 18, wherein the service redirection message further comprises:
a RETURN_IF FAIL field having a value of 1;
a REDIRECT_TYPE field having a value of 0; and
a BAND_CLASS field that specifies a CDMA band class.

21. The non-transitory computer-readable medium of claim 13, further comprising:
a sixth computer-readable program code that causes the computer to register the communication device with the femtocell network upon entering coverage of a femtocell regardless of whether the communication device has a subscription to the femtocell network.

22. An apparatus for redirecting communication comprising: means for receiving a registration message from a communication device; means for determining a current communication frequency of the communication device; means for determining whether the communication device has a subscription to a femtocell network; means for determining whether the current communication frequency is a shared frequency for macrocells and femtocells; and means for sending a service redirection message to the communication device to instruct the communication device to retune to a first communication frequency based on whether the communication device has a subscription to the femtocell network and whether the current communication frequency is a shared frequency, wherein the service redirection message specifies channels used by the femtocell network when the communication device has a subscription to the femtocell network.

23. The apparatus of claim 22, further comprising:
means for generating a first list of CDMA channels available to the communication device for accessing a macro network; and
means for generating a second list of CDMA channels available to the communication device for accessing the macro network or the femtocell network, wherein the first communication frequency is from the first or second list.

24. The apparatus of claim 23, wherein the macro network is a CDMA based network.

25. The apparatus of claim 22, wherein the service redirection message comprises:
an information to redirect the communication device to a CDMA system;
an information that specifies a NUM_CHANS field; and
an information that specifies one or more CDMA channels for the communication device to retune using one or more CDMA_CHAN fields, wherein a number of CDMA channels is based on the NUM_CHANS field.

26. The apparatus of claim 25, wherein the first communication frequency is specified by one of the CDMA_CHAN fields.

27. The apparatus of claim 24, wherein the service redirection message further comprising:
a RETURN_IF_FAIL field having a value of 1;
a REDIRECT_TYPE field having a value of 0; and
a BAND_CLASS field that specifies a CDMA band class.

28. The apparatus of claim 22, wherein the service redirection message specifies CDMA channels only used by a macro network when the communication device does not have a subscription to the femtocell network.

29. The apparatus of claim 22, further comprising:
means for registering the communication device with femtocell network regardless of whether the communication device has a subscription to the femtocell network prior to sending the service redirection message.

30. A method for communication comprising: registering a communication device with a macro network; receiving a service redirection message from the macro network based on whether the communication device has a subscription to a femtocell network and whether a current communication frequency of the communication device is a shared frequency for macrocells and femtocells; and tuning to a first communication frequency based on an information in the service redirection message, wherein the service redirection message specifies channels used by the femtocell network when the communication device has a subscription to the femtocell network.

31. The method of claim 30, wherein the service redirection message comprises:
an information to redirect the communication device to a CDMA system;
an information that specifies a NUM_CHANS field; and an information that specifies one or more CDMA channels for the communication device to retune using one or more CDMA_CHAN fields, wherein a number of CDMA channels is based on the NUM_CHANS field.

32. The method of claim 31, wherein the first communication frequency is specified by one of the CDMA_CHAN fields.

33. The method of claim 31, wherein the service redirection message specifies CDMA channel or channels only used by the macro network when the communication device does not have a subscription to the femtocell network.

34. The method of claim 31, wherein the service redirection message further comprises:
a RETURN_IF_FAIL field having a value of 1;
a REDIRECT_TYPE field having a value of 0; and
a BAND_CLASS field that specifies a CDMA band class.

35. The method of claim 30, wherein the macro network is a CDMA based network.

36. A communication apparatus comprising: means for registering a communication device with a macro network; means for receiving a service redirection message from the macro network based on whether the communication device has a subscription to a femtocell network and whether a current communication frequency of the communication device is a shared frequency for macrocells and femtocells; and means for tuning to a first communication frequency based on an information in the service redirection message, wherein the service redirection message specifies channels used by the femtocell network when the communication device has a subscription to the femtocell network.

37. The communication apparatus of claim 36, wherein the service redirection message comprises:
an information to redirect the communication device to a CDMA system;
an information that specifies a NUM_CHANS field; and
an information that specifies one or more CDMA channels for the communication device to tune to using one or more CDMA_CHAN fields, wherein a number of CDMA channels is based on the NUM_CHANS field.

38. The communication apparatus of claim 37, wherein the first communication frequency is specified by one of the CDMA_CHAN fields.

39. The communication apparatus of claim 37, wherein the service redirection message specifies CDMA channel or channels only used by the macro network when the communication device does not have a subscription to the femtocell network.

40. A non-transitory computer-readable medium having computer-readable program code functions embedded in said medium for causing a computer to redirect communication comprising: a first computer-readable program code that causes the computer to register a communication device with a macro network; a second computer-readable program code that causes the computer to process a service redirection message received from the macro network based on whether the communication device has a subscription to a femtocell network and whether a current communication frequency of the communication device is a shared frequency for macrocells and femtocells; and a third computer-readable program code that causes the computer to tune to a first communication frequency based on an information in the service redirection message, wherein the service redirection message specifies channels used by the femtocell network when the communication device has a subscription to the femtocell network.

41. The non-transitory computer-readable medium of claim 40, wherein the service redirection message comprises:
an information to redirect the communication device to a CDMA system;
an information that specifies a NUM_CHANS field; and
an information that specifies one or more CDMA channels for the communication device to tune to using one or more CDMA_CHAN fields, wherein a number of CDMA channels is based on the NUM_CHANS field.

42. The non-transitory computer-readable medium of claim 41, wherein the first communication frequency is specified by one of the CDMA_CHAN fields.

43. The non-transitory computer-readable medium of claim 40, wherein the service redirection message specifies CDMA channel or channels only used by a macro network when the communication device does not have a subscription to the femtocell network.

44. An apparatus for redirecting communication comprising: at least one processor configured to: receive a registration message from a communication device; determine a current communication frequency of the communication device; determine whether the communication device has a subscription to a femtocell network; determine whether the current communication frequency is a shared frequency for macrocells and femtocells; and send a service redirection message to the communication device to instruct the communication device to retune to a first communication frequency based on whether the communication device has a subscription to the femtocell network and whether the current communication frequency is a shared frequency, wherein the service redirection message specifies channels used by the femtocell network when the communication device has a subscription to the femtocell network; and
a memory coupled to the at least one processor.

45. The apparatus of claim 44, wherein the at least one processor is further configured to:
generate a first list of CDMA channels available to the communication device for accessing a macro network; and
generate a second list of CDMA channels available to the communication device for accessing the macro network or the femtocell network, wherein the first communication frequency is from the first or second list.

46. The apparatus of claim 45, wherein the macro network is a CDMA based network.

47. The apparatus of claim 44, wherein the service redirection message comprises:
an information to redirect the communication device to a CDMA system;
an information that specifies a NUM_CHANS field; and
an information that specifies one or more CDMA channels for the communication device to retune using one or more CDMA_CHAN fields, wherein a number of CDMA channels is based on the NUM_CHANS field.

48. The apparatus of claim 47, wherein the first communication frequency is specified by one of the CDMA_CHAN fields.

49. The apparatus of claim 47, wherein the service redirection message further comprising:
a RETURN_IF_FAIL field having a value of 1;
a REDIRECT_TYPE field having a value of 0; and
a BAND_CLASS field that specifies a CDMA band class.

50. The apparatus of claim 44, wherein the service redirection message specifies CDMA channels only used by a macro network when the communication device does not have a subscription to the femtocell network.

51. The apparatus of claim 44, wherein the at least one processor is further configured to register the communication device with femtocell network regardless of whether the communication device has a subscription to the femtocell network prior to sending the service redirection message.

52. A communication apparatus comprising: at least one processor configured to: register a communication device with a macro network; receive a service redirection message from the macro network based on whether the communication device has a subscription to a femtocell network and whether a current communication frequency of the communication device is a shared frequency for macrocells and femtocells, wherein the service redirection message specifies channels used by the femtocell network when the communication device has a subscription to the femtocell network; and
    tune to a first communication frequency based on an information in the service redirection message; and
    a memory coupled to the at least one processor.

53. The communication apparatus of claim 52, wherein the service redirection message comprises:
    an information to redirect the communication device to a CDMA system;
    an information that specifies a NUM_CHANS field; and
    an information that specifies one or more CDMA channels for the communication device to tune to using one or more CDMA_CHAN fields, wherein a number of CDMA channels is based on the NUM_CHANS field.

54. The communication apparatus of claim 53, wherein the first communication frequency is specified by one of the CDMA_CHAN fields.

55. The communication apparatus of claim 53, wherein the service redirection message specifies CDMA channel or channels only used by the macro network when the communication device does not have a subscription to the femtocell network.

\* \* \* \* \*